United States Patent [19]
König et al.

[11] Patent Number: 6,059,502
[45] Date of Patent: May 9, 2000

[54] PLASTIC NUT FOR CONNECTING PANEL-LIKE PARTS

[75] Inventors: Gottfried König; Stephan Weitzel, both of Bad Laasphe, Germany

[73] Assignee: EJOT Verbindungstechnik GmbH & Co., Bad Laasphe, Germany

[21] Appl. No.: 08/952,105

[22] PCT Filed: Aug. 27, 1997

[86] PCT No.: PCT/EP97/04667

§ 371 Date: Jul. 10, 1998

§ 102(e) Date: Jul. 10, 1998

[87] PCT Pub. No.: WO98/13607

PCT Pub. Date: Apr. 2, 1998

[30] Foreign Application Priority Data

Sep. 28, 1996 [DE] Germany .......................... 196 39 396
Jul. 7, 1997 [DE] Germany .......................... 197 28 988

[51] Int. Cl.$^7$ .......................... F16B 37/04; F16B 39/284
[52] U.S. Cl. .......................... 411/182; 411/21; 411/112; 411/508
[58] Field of Search .......................... 411/21, 111, 112, 411/113, 182, 508, 509, 342, 552

[56] References Cited

U.S. PATENT DOCUMENTS 3,785,421  1/1974  Launay .......................... 411/112 X
4,923,347  5/1990  Moryl et al. .......................... 411/182
5,173,025  12/1992  Asami .......................... 411/21 X
5,511,919  4/1996  Scalise .......................... 411/182 X

FOREIGN PATENT DOCUMENTS 8701419  3/1987  WIPO .......................... 411/182

*Primary Examiner*—Neill Wilson
*Attorney, Agent, or Firm*—R. William Beard, Jr.; Frohwitter

[57] ABSTRACT

The invention relates to a plastic nut for inserting into a through-hole in a panel-like component, the plastic nut comprising retaining parts, of which one is designed as a flange which can be pressed onto the component from the fitting side and another is designed as snap-action hooks which can be pressed on from the opposite side and are intended for latching in behind the component, the retaining parts being provided with a nut part which has a receiving bore for a screw, the flange being a constituent part of a flange part which encloses the nut part, and it being possible for the nut part to be pressed in the direction of the flange, in which case the nut part, which can be moved axially with respect to the flange part, is pressed in the direction of the flange part by an elastic supporting arrangement which forms a spring zone, it being the case that, once the plastic nut has been inserted, the spring zone brings the nut part and the flange part into abutment against the component, different thicknesses of the component being compensated in the process.

23 Claims, 8 Drawing Sheets

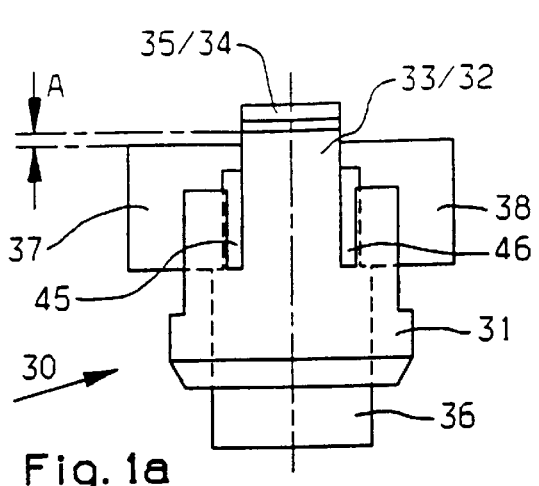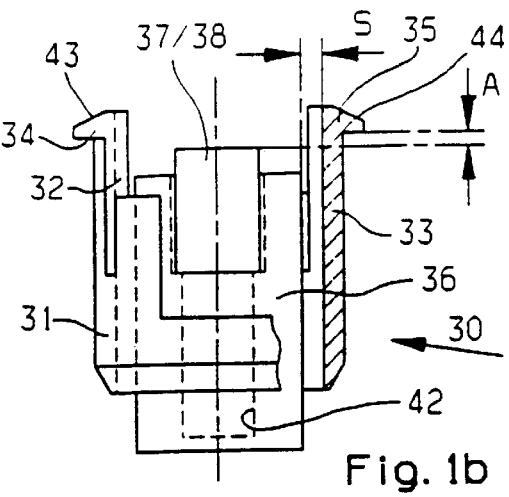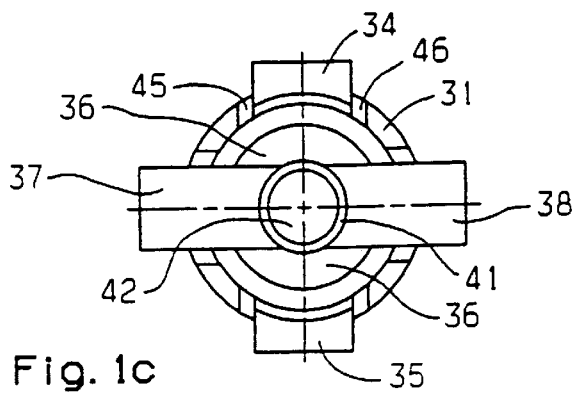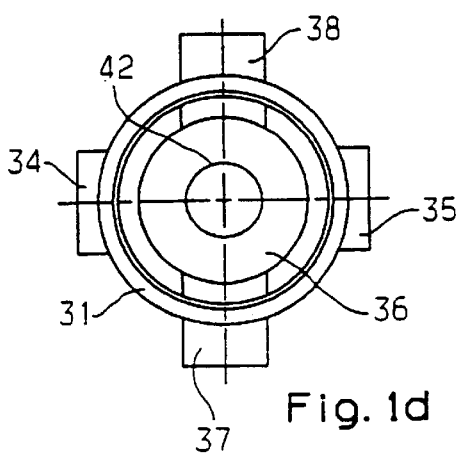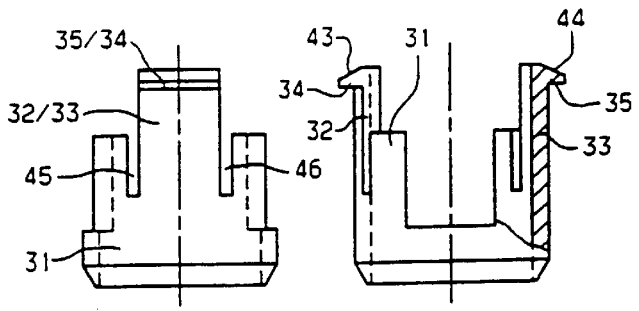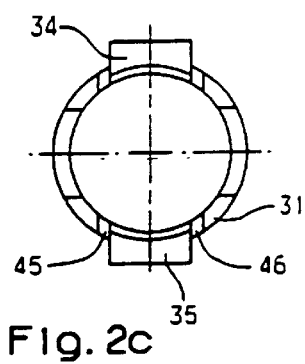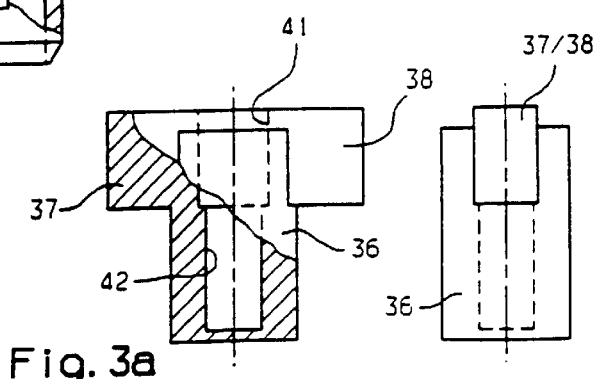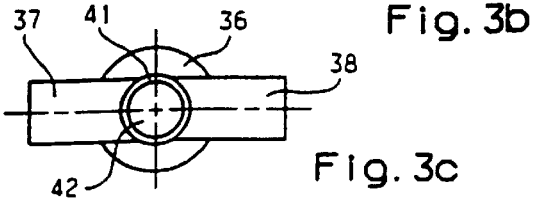

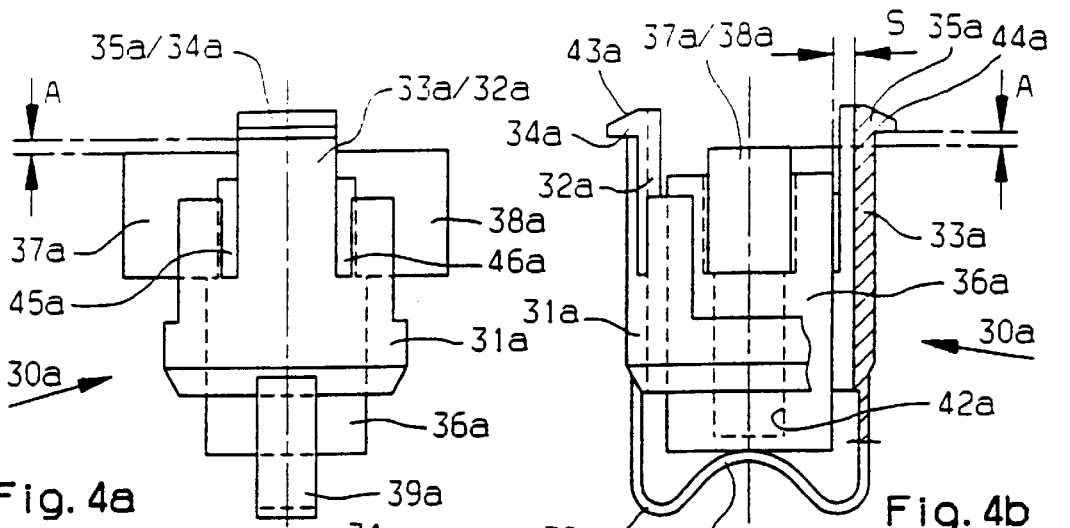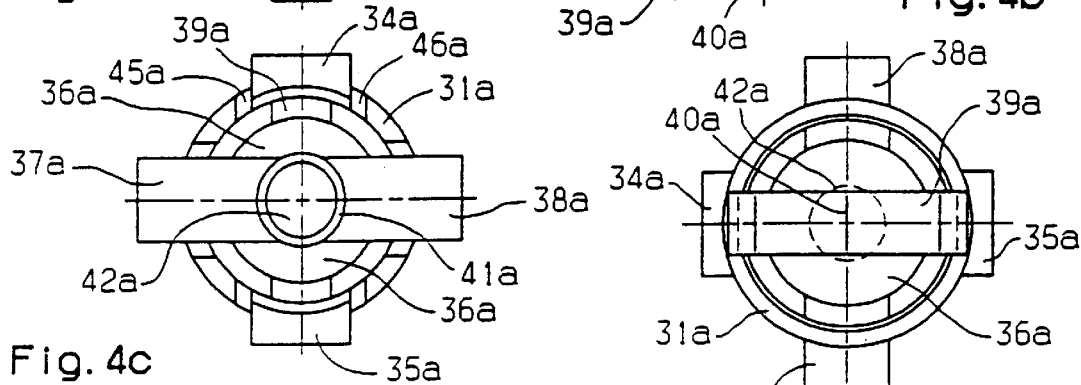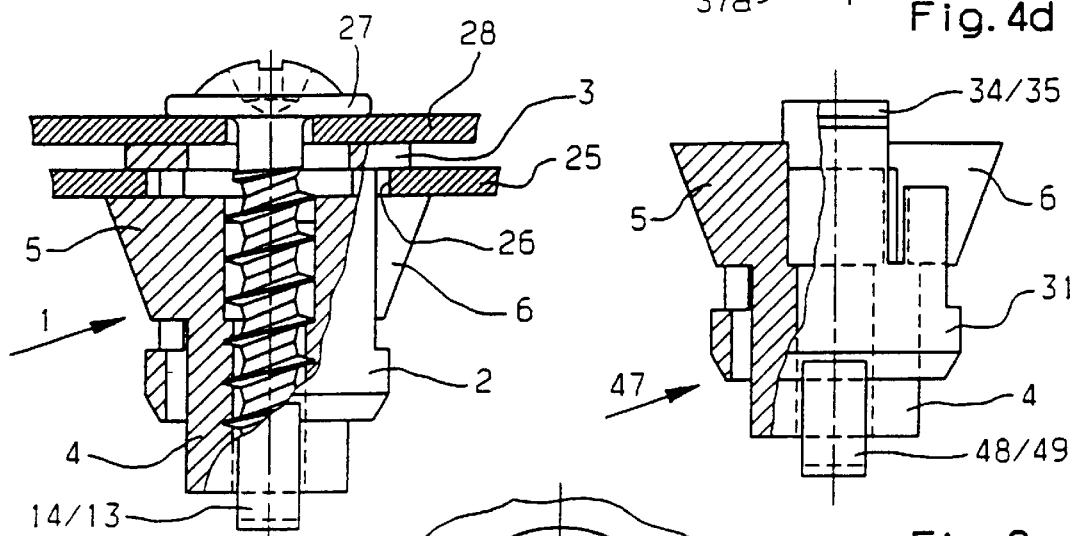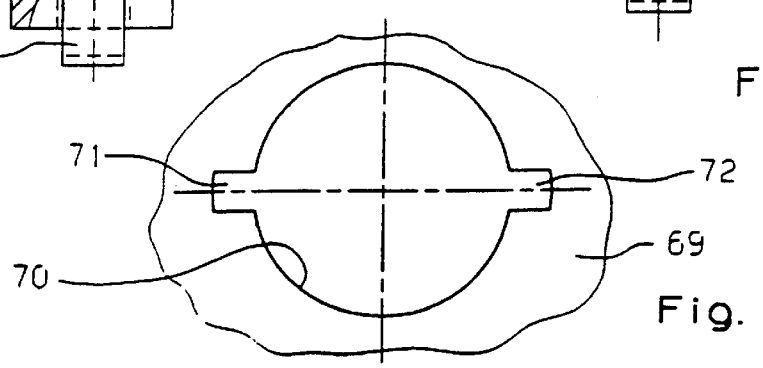

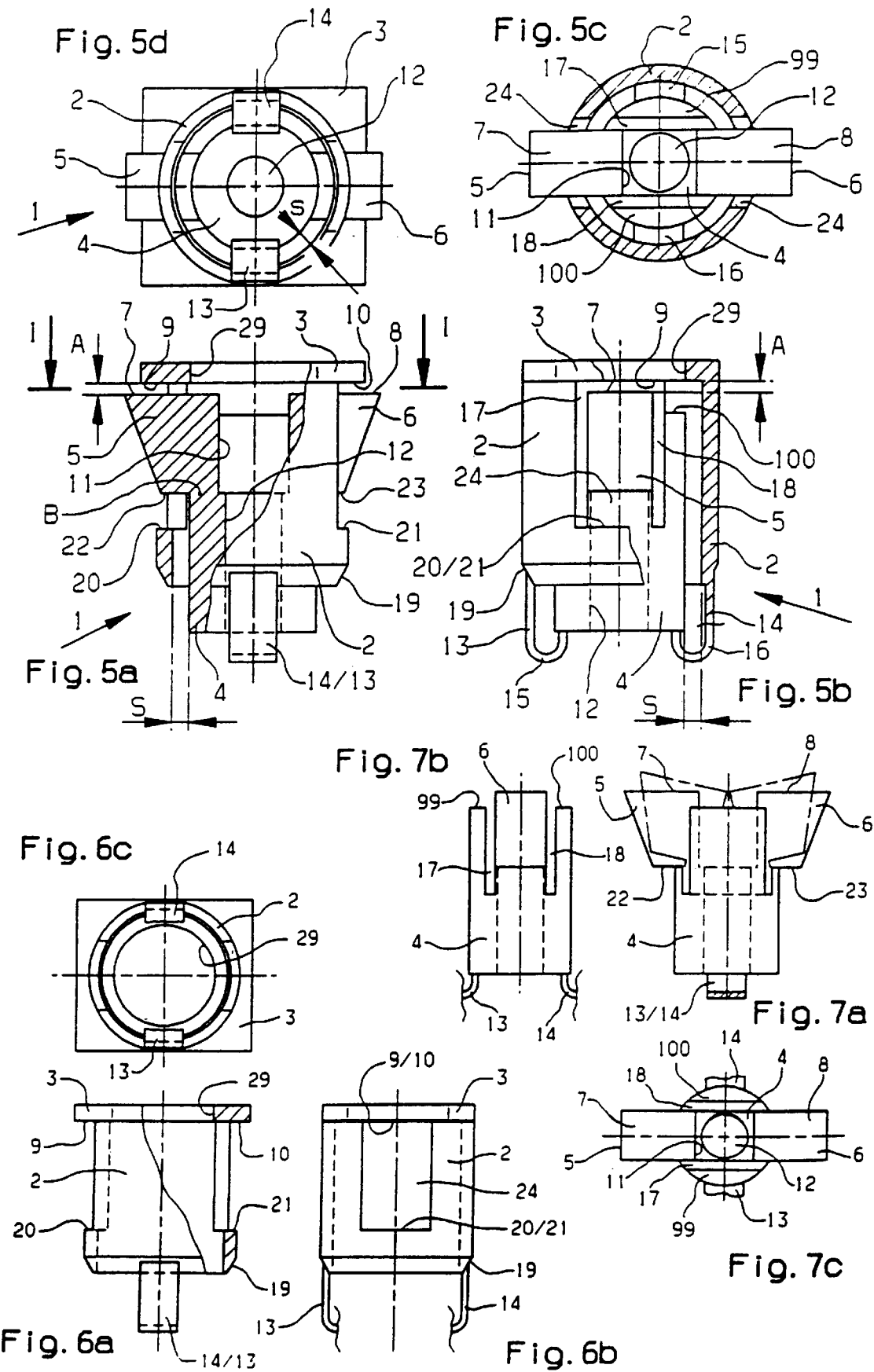

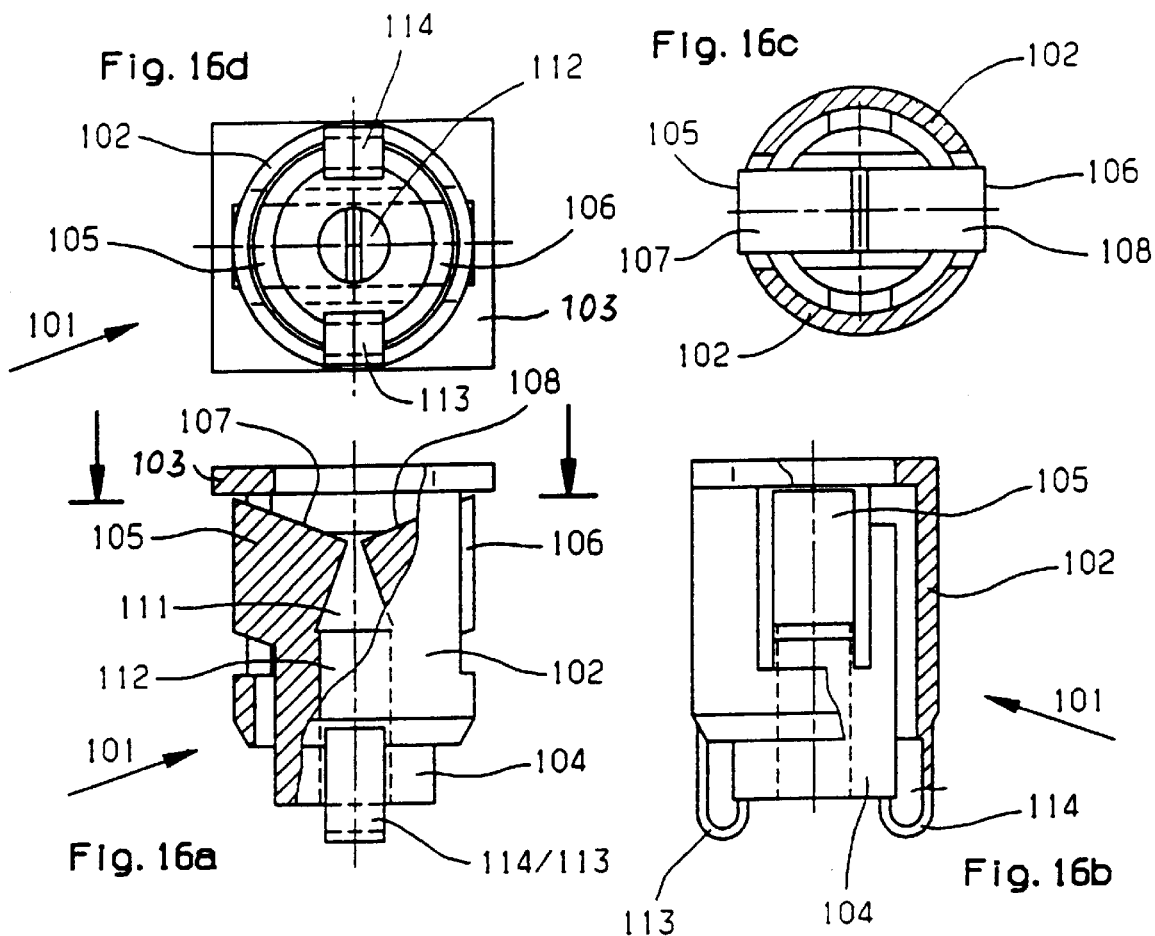
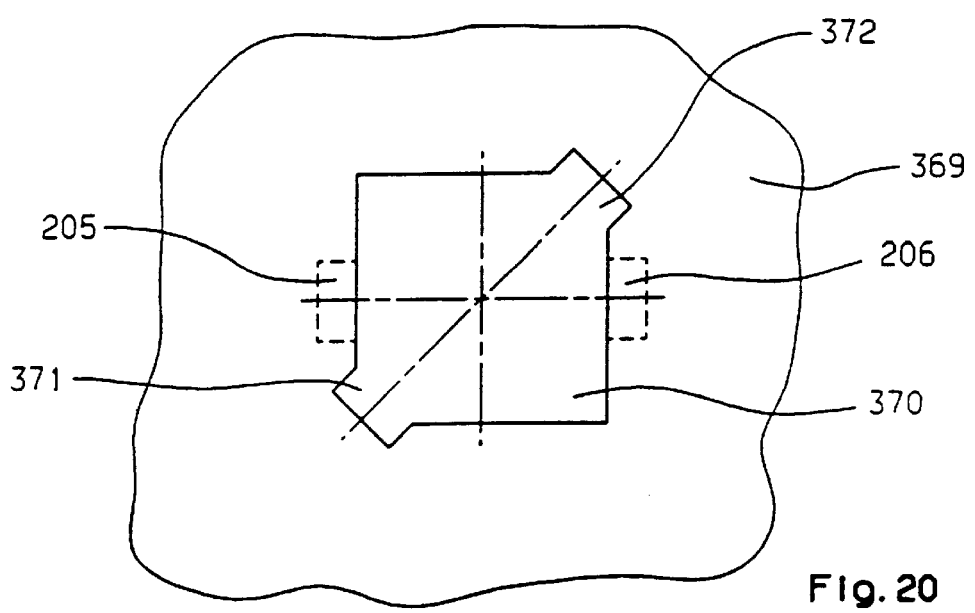

PLASTIC NUT FOR CONNECTING PANEL-LIKE PARTS

BACKGROUND OF THE INVENTION

The invention relates to a plastic nut for inserting into a through-hole in a panel-like component, the plastic nut comprising retaining parts, of which one is designed as a flange which can be pressed onto the component from the fitting side and another is designed as snap-action hooks which can be pressed on from the opposite side and are intended for latching in behind the component, the retaining parts being provided with a nut part which has a receiving bore for a screw, the flange being a constituent part of a flange part which encloses the nut part, and it being possible for the nut part to be pressed in the direction of the flange.

A nut of this type is disclosed in DE-A 29 28 619. The known nut is formed in one piece from plastic and essentially comprises a nut part which is provided with a receiving bore for a screw and is connected, via film hinges, to two flange halves arranged on either side of it. The connection of the nut part to the two flange halves via a film hinge in each case makes it possible for the entire structural element with laterally extending flange halves to be injection moulded in one mould, whereupon the action of pressing the two flange halves onto the nut part, this being made possible by the elasticity of the film hinges, produces the finished plastic nut, in which the nut part is connected to the two flange halves in an axially non-displaceable manner. Snap-action hooks with insertion slopes provided on them project laterally from the nut part, these hooks being pressed together when the plastic nut is inserted into the through-hole in a panel-like component and, when the flange halves butt against the component, spring back and latch in behind the component in the process. On account of the given distance between the snap-action hook and the flange halves, the known plastic nut can be inserted into through-holes in panel-like components of different thicknesses, as long as the thickness does not exceed said distance. However, due to the possible play of the panel-like component between the flange halves and the snap-action hook, the plastic nut is only retained loosely when it is inserted into a through-hole, which situation is not desirable in the case of pre-fitted structural elements, in particular during transportation and later use. In the case of the known plastic nut, fixed connection to a panel-like component is brought about by a screw which is screwed into the nut part drawing the nut part, along with its snap-action hooks, in the direction of the flange halves, as a result of which the film hinges break off and, under the action of the screwing-in movement, the nut part is pressed onto the panel-like component by way of its snap-action hooks. In the event of the screw being released, the plastic nut then necessarily loosens with respect to the panel-like component.

SUMMARY OF THE INVENTION

The object of the invention is to provide a plastic nut of the type mentioned in the introduction which can be fitted on panel-like components of different thicknesses such that the plastic nut adapts automatically to the respective thickness of the component and produces a vibration-free connection.

This object is achieved in that the nut part, which can be moved axially with respect to the flange part, is pressed in the direction of the flange part by an elastic supporting arrangement which forms a spring zone, it being the case that, once the plastic nut has been inserted, the spring zone brings the nut part and the flange part into abutment against the component, different thicknesses of the component being compensated in the process.

The spring zone which acts between the nut part and the flange halves provides an elastic supporting arrangement by which the nut part is pressed automatically in the direction of the flange, with the result that, under the spring stressing provided by the spring zone, the plastic nut is secured on the component, by way of its flange and its snap-action hooks, such that it does not vibrate, this resulting in a non-rocking and thus non-rattling connection between the plastic nut and component. The plastic zone thus makes it possible, while compensating different thicknesses of the component which receives the plastic nut, that, once the plastic nut has been inserted, the nut part and flange part butt against the component irrespective of the action of a screw being tightened, as a result of which the very insertion of the plastic nut results in a vibration-free connection between the component and the plastic nut.

In order to prevent the nut part from being able to turn with respect to the flange part in the event of a screw being screwed into the nut part and tightened, the flange part has a guide for the nut part, by means of which the flange part retains the nut part such that it cannot turn.

Expediently, the nut part is pressed in the direction of the flange by an elastic supporting arrangement which forms a spring zone. The plastic nut then secures itself on the relevant component, with the result that, in the event of deformation of the elastic supporting arrangement, in the region of its spring zone, the plastic nut is positioned against the component such that it does not vibrate, and this results in a non-rocking and thus non-rattling connection between the plastic nut and component. Of course, it is also possible here that the plastic nut, when inserted into a particularly thin component, only butts against the component loosely, although definitive fastening on the component is produced in that the action of tightening the screw for fastening a further subassembly on the panel-like component also fastens the plastic nut on the component.

The spring zone makes it possible, while compensating different thicknesses of the component which receives the plastic nut, that, once the plastic nut has been inserted, the nut part and flange part butt against the component, this resulting in a vibration-free connection between the component and plastic nut.

The flange is expediently designed as a plate, the nut part then being provided with the snap-action hooks. When the plastic nut is inserted into a component, the flange, which is designed as a plate, then comes into abutment against the component, while, on the opposite side, the snap-action hooks of the nut part latch in behind the component and thus connect the plastic nut to the component.

Another possible configuration of the plastic nut is that in which the flange is divided up into segments which are each provided with a snap-action hook. In this case, the plastic nut latches to the component via the snap-action hooks which are connected to the flange, the nut part forming the abutment with respect to the snap-action hook.

If the nut part is provided with the snap-action hooks, the plastic nut is suitable, in particular, for being inserted into the through-hole in the component with the nut part in front. If, on the other hand, the flange is provided with the snap-action hooks, then this provides the possibility of inserting the nut part into the through-hole in the component with the flange in front. Furthermore, it is also possible that, in addition to the flange provided with the snap-action hooks, the nut part is also provided with snap-action hooks, which results in such a plastic nut being able to be inserted into the through-hole in a component from either side of the latter.

In order that the nut part is guided securely in the flange part, the flange part is expediently configured such that it surrounds the nut part in a sleeve-like manner.

In order to avoid overstressing of the strip arrangement, the flange part and the nut part are expediently provided with stops for limiting the capacity for axial movement of the nut part with respect to the flange part.

Favourable production of the nut part and flange part can be achieved in that the nut part and flange part are connected to one another integrally via the plastic strips, which form the elastic strip arrangement.

The nut part and flange part can also be held together by a latching means, which takes effect when the nut part is pushed into the flange part.

In an appropriate configuration, the latching means expediently contains the elastic strips.

In order that, when a screw is screwed into the nut part, the flange part does not turn at the same time, the flange is expediently provided, on its side which is directed towards the nut part, with a turning-prevention means which fits into the through-holes.

The plastic nut may also be configured such that it seals the through-hole. This is achieved in that the flange is provided with a sealing zone.

In order to configure the plastic nut favourably for the purpose of receiving a screw, the receiving bore of the nut part is expediently configured such that the receiving bore forms a through-hole on the side which is directed towards the flange and has a narrower region adjoining said through-hole. The receiving bore then makes it possible, first of all over its length which forms the through-hole, to receive the screw, which is thus guided for the following screwing-in operation. The narrower region, which adjoins the through-hole, is then provided for receiving the thread of the screw. For this purpose, the narrower region may have a diameter which makes it possible for a self-tapping screw to be screwed in. It is also possible, however, for the narrower region to be provided with a thread which matches the thread of a screw which is to be screwed in. In order to make it easier to screw in a screw, the receiving bore is expediently provided, at its transition to its narrower region, with a thread-like slope with one or more steps, into which the screw can be easily screwed.

In order to extend the possibility of compensating different thicknesses of the component, it is possible that, on its side which is directed toward the component, the flange is provided with latching noses which can latch in behind that side of the component which is directed away from the flange. In this case, the spring zone of the elastic strips can be designed essentially for particularly thick components and, for the case where the plastic nut is fitted on a particularly thin component, the latter can be secured on the plastic nut by means of the latching noses.

The plastic nut may also be configured such that it can be used to compensate relatively large tolerances as regards the position of the screw, received by it, with respect to the flange part and thus with respect to the through-hole in the panel-like component. This is achieved in that the nut part has a degree of play with respect to the flange part which permits mutual displacement in the radial direction. The flange part thus guides the nut part with this degree of play, with the result that a screw which is to be screwed into the nut part can find its own position with respect to the component within this degree of play.

It is also possible to make the snap-action hooks act in a particular manner. Specifically, the snap-action hooks may be connected resiliently to the nut part such that, upon insertion, they pass essentially freely through the through-hole and, for the purpose of latching in, can be pressed outwards by the action of the screw being screwed in. This makes it easier to insert the plastic nut into a through-hole in a panel-like component, which is essential practice, in particular, in the case of components consisting of sensitive material. This is because, in the case of the envisaged configuration, the snap-action hooks can pass through the through-hole virtually without contact, with the result that they cannot adversely affect the material of the panel-like component. For the purpose of latching the snap-action hooks in, the action of screwing in a screw is used, this screw, when screwed into the receiving bore in the nut part, pressing the snap-action hooks outwards, with the result that the latter are positioned against the component on that side which is directed away from the flange. In this manner, a secure connection between the plastic nut and the component can be produced by the pressure of the screw on the snap-action hooks in the radial direction.

A further configuration consists in that the snap-action hooks pass rigidly into the nut part, and the nut part is connected to the flange part via an elastic supporting arrangement, which presses the nut part in the direction of the flange part and also retains the nut part, together with the snap-action hooks, in a rotationally resilient manner with respect to the flange part. This configuration of the plastic nut makes it possible for the latter to be inserted into a through-hole in which, on account of a turning-prevention means which fits into the through-hole and is positioned on the plastic nut, the plastic nut itself is retained such that it cannot turn, it being possible, on account of the nut part being retained in a rotationally resilient manner with respect to the flange part, for the nut part to be turned into a position in which the snap-action hooks connected rigidly to said nut part can be guided through recesses of the through-hole. On account of being retained in a rotationally resilient manner, the snap-action hooks then spring back behind the component, in which case they position themselves behind the component and press against the latter, as a result of which the plastic nut is connected to the component.

BRIEF DESCRIPTION OF THE DRAWINGS

Exemplary embodiments of the invention are illustrated in the figures, in which:

FIGS. 1a–d show four views of a plastic nut in the case of which the snap-action hooks form a constituent part of the flange part;

FIGS. 2a–c show three views of the flange part of the plastic nut according to FIG. 1 alone;

FIGS. 3a–c show three views of the nut part of the plastic nut according to FIG. 1 alone;

FIGS. 4a–d show the plastic nut according to FIG. 1, but additionally having a wave-form supporting arrangement;

FIGS. 5a–d show four views of a plastic nut in the case of which the snap-action hooks are provided on the nut part and elastic strips form the supporting arrangement;

FIGS. 6a–c show three views of the flange part of the plastic nut according to FIG. 5 alone;

FIGS. 7a–c show three views of the nut part of the plastic nut according to FIG. 5 alone;

FIG. 8 shows the assembled arrangement of a plastic nut according to FIG. 5 which is fitted on a panel-like component and has a subassembly screwed on;

FIG. 9 shows a plastic nut in the case of which snap-action hooks are provided both on the nut part and on the flange-part;

FIG. 11 shows a panel-like component with a through-hole which makes it possible for turning to be prevented in a particular manner;

FIGS. 16a–d show four views of a configuration which has snap-action hooks which can be pressed outwards by the action of a screw being screwed in;

FIG. 20 shows a panel-like component with recesses for the purpose of fitting the plastic nut.

DETAILED DESCRIPTION OF THE INVENTION

Figure 10A:
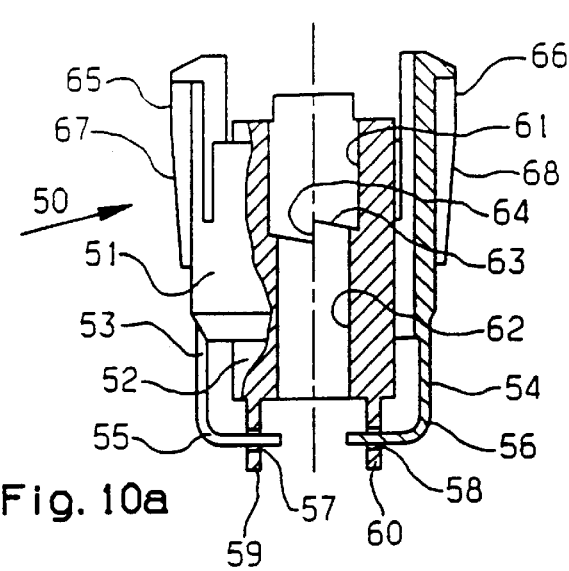
FIGS. 10a and b show two views of a plastic nut in the case of which the flange part and nut part are designed as two separate parts.

The exemplary embodiment which is illustrated in FIGS. 1a–d is a plastic nut in the case of which the flange is provided with snap-action hooks.

FIGS. 1a and b show the plastic nut 30, as seen from the side in each case, in the fully assembled state with the flange part 31, which passes into flange segments 32, 33 which terminate radially outward in the snap-action hooks 34, 35. The flange part 31 surrounds the nut part 36 in a sleeve-like manner, to be precise such that the nut part 36 can be displaced in the axial direction with respect to the flange part 31. The two abutments 37, 38 project radially outward from the nut part 36 and can be seen clearly from the illustration specifically of the nut part 36 according to FIGS. 3a–c. The abutments 37 and 38 are connected essentially rigidly to the nut part 36. FIG. 1c shows a view of the plastic nut 30 as seen from above, this view clearly showing the two abutments 37 and 38 and the snap-action hooks 34 and 35. Moreover, FIG. 1c shows the receiving bore, which comprises the through-hole 41 and the narrower region 42, designed here as a blind hole, and these parts act in the same manner as those parts according to FIG. 5a–d which have the same designations. FIG. 1d shows the plastic nut 30 as seen from the underside. The means of limiting the capacity for axial movement of the nut part 36 with respect to the flange part 31 is configured here in the same manner as in the exemplary embodiment according to FIG. 5.

FIGS. 2a–c illustrate three views of the flange part 31 on its own. FIGS. 3a–c show the nut part 36 on its own.

FIGS. 4a to d show the plastic nut which is illustrated in FIGS. 1a to d, although in this case the nut is supplemented by an elastic supporting arrangement 39a, 40a which forms a spring zone. The same designations are used for the illustrations in FIGS. 1, 2, 3 and 4, although all designations are supplemented by an "a" in conjunction with the plastic nut according to FIGS. 4a to d.

The nut part 36a and the flange part 31a are attached to one another by the wave-form supporting arrangement 39a, 40a, which projects from the flange part 31a, in the direction away from the snap-action hooks 34a, 35a, with one leg in each case and forms the wave line with the peak 40a, which presses against that end side of the nut part 36a which is directed towards it. The elasticity of the supporting arrangement 39a, 40a makes it possible for the nut part 36a to be displaced away from the snap-hooks 34a, 35a, as a result of which the distance A depicted in FIG. 4b (see also FIG. 1b) can be changed accordingly, in particular increased.

If the supporting arrangement 39a, 40a is connected in some way, e.g. by adhesive bonding, to the end side of the nut part 36a, a fixed connection is produced between the flange part 31a and nut part 36a, and it is also possible for this connection to be designed in one piece if the nut part 36a and flange part 31a, together with the supporting arrangement 39a, 40a, are injection moulded from plastic in one operation. Otherwise, as regards the configuration and mode of operation of the plastic nut according to FIGS. 4a to d, you are referred to the corresponding explanations relating to FIGS. 1a to d.

The exemplary embodiment which is illustrated in FIGS. 5a to d is a plastic nut in the case of which the nut part is provided with snap-action hooks.

FIGS. 5a and b show the plastic nut 1, as seen from the side in each case, in the fully assembled state with the flange part 2, which passes into the flange 3. The flange part 2 surrounds the nut part 4 in a sleeve like manner, to be precise such that the nut part 4 can be displaced in the axial direction with respect to the flange part 2. The two snap-action hooks 5 and 6 project radially outwards from the nut part 4, and the abutment surfaces 7 and 8, which are directed towards the flange 3, of said hooks maintain the distance A from the abutment surfaces 9 and 10, which are directed towards the nut part 4. This distance A is given in the non-fitted state of the plastic nut 1. In order that the inner configuration of the plastic nut 1 is clear in FIG. 5a, a section of the flange part 2 and of the nut part 4 which is directed towards the viewer is broken away in FIG. 5a, to expose a receiving bore for a screw (not illustrated) in the nut part 4, this receiving bore forming the through-hole 11 and the adjoining narrower region 12, which has a smaller diameter than the through-hole 11, with the result that a screw which is screwed into the receiving bore 11/12 is first of all guided freely in the region of the through-hole 11 and, as it is screwed further into the narrower region 12, either taps itself a thread in this region or screws into a thread which is already provided in the region 12 (said thread not being illustrated in FIG. 5a. The through-hole 11 continues, in the direction of the flange 3, in the round through-passage 29 in the flange 3, with the result that a screw which is to be inserted into the plastic nut 1 can be guided through the flange 3 and inserted into the through-hole 11. As can be seen, the through-hole passage 29 has a larger diameter than the through-hole 11, with the result that it is possible, from the side of the flanges, for a tool to exert an axial pressure on the end surfaces 99/100 of the nut part 4, these end surface being visible in FIG. 5c, such pressure then causes the plastic nut 1 to be pressed into the through-hole in a component.

The flange part 2 and the nut part 4 are connected to one another via the two elastic strips 13 and 14. The elastic strips 13 and 14 project from the flange part 2, in the direction away from the flange 3, with one leg and form a U, which has its other leg positioned against that side of the nut part 4 which is directed away from the flange 3, said other leg being connected fixedly to said nut part. The present case is concerned with a single-piece plastic component which comprises flange part 2 and nut part 4 and is injection moulded in one piece, with the result that the two elastic strips 13 and 14 likewise consist of plastic and, on account of their relatively small thickness, have sufficient elasticity. On account of this elasticity, the nut part 4 can be displaced away from the flange in the axial direction, as a result of which the distance A can be increased correspondingly.

The flange part 2 guides the nut part 4 with a degree of play S which permits mutual displacement in the radial direction (see FIGS. 5a, b and d). This play S is formed by the distance, depicted in the three figures mentioned above, between the flange part 2 and nut part 4 in the region in which the flange part 2 surrounds the nut part 4 in a sleeve-like manner. This configuration allows the nut part 4 to be displaced in the radial direction with respect to the flange part, the strips 13, 14 yielding correspondingly on account of their elasticity. This makes it possible to compensate for tolerances in the dimensions of the flange part 2 and nut part 4 and, moreover, it is thus possible for the nut part 4 to be adapted to a possibly offset screw (see FIG. 8) within the range of the play S.

FIG. 5c shows the section along the line I—I, with the result that the abutment surfaces 7 and 8 can be seen in FIG. 5c. It is also possible to see the bent parts 15 and 16 of the strips 13, 14 which connect the flange part 2 and the nut part 4 to one another. The slits 17 and 18 ensure that the snap-action hooks 5 and 6 can move elastically and these slits extend into the nut part 4 from the side of the flange 3. As a result, it is only the region B in the nut part which remains, this region having a cross-section which ensures that the snap-action hooks 5 and 6 can move.

FIG. 5d shows the plastic nut as seen from the side which is directed away from the flange 3, in which case the two snap-action hooks 5 and 6 and the elastic strips 13 and 14 are directed towards the viewer. The viewer can also see the narrower region 12 and the flange part 2 which surrounds the nut part 4 in a sleeve-like manner.

It should also be pointed out that, on its side which is directed away from the flange 3, the flange part 2 is provided with an inlet slope 19 which makes it easier for the plastic nut 1 to be inserted into the through-hole in a component, it also being possible for this insertion operation to take place automatically.

FIG. 5a also shows, in that region of the flange part 2 which is directed away from the flange 3, the stop 20, 21 which runs on the flange part 2 between the slits 17 and 18 and interacts with the corresponding stop 22, 23 on the snap-action hooks 5 and 6. The nut part 4 with the snap-action hooks 5 and 6 can thus only be pressed away from the flange 3 until such time as the stops 20–22 and 21–23 come into contact with one another and thus limit the displacement of the nut part 4 with respect to the flange part 2. This also defines the maximum distance A between the abutments surfaces 7/9 and 8/10, that is to say the plastic nut 1 can be used for fitting out panel-like components of corresponding thickness.

FIG. 5c shows in the flange part 2 in each case one window 24 (see also FIG. 6b) through which the snap-action hook 5 or 6 passes. The axially running borders of the window 24 form stops for limiting turning of the nut part 4 with respect to the flange part 2, this resulting in the flange part 2 guiding the nut part 4 such that it cannot turn.

FIGS. 6a to c illustrate three views of the flange part 2 alone, to be precise with those legs of the elastic strips 13 and 14 which lead to said flange part.

FIG. 6b also shows the window 24 in the flange part 2, through which the snap-action hooks 5 and 6 of the nut part 4 project. The width of the window 24 can also be seen from FIG. 5b since said width is determined by the outer walls of the slits 17 and 18.

FIGS. 7a to c illustrate three views of the nut part 4 on its own, chain-dotted lines depicting the bent together position of the two snap-action hooks 5 and 6 in FIG. 7a. This is intended to indicate how the snap-action hooks 5 and 6 move when they are inserted into a through-hole in a component. When the nut part 4 of the relevant plastic nut comes into contact with the component by way of its flange 3, the snap-action hooks 5 and 6 spring back into their normal position and thus latch in behind the component.

FIG. 8 shows the plastic nut 1 according to FIGS. 5a to d, 6a to c and 7a to c connected to the panel-like component 25, which is retained between the flange 3 and the snap-action hooks 5 and 6, the flange 3 and the snap-action hooks 5 and 6 being pressed together on account of the stressing which is inherent in the elastic strips 13 and 14. In this position, in which the flange part 2 passes through the through-hole 26 in the component 25, the screw 27 is screwed into the nut part 4 for the purpose of fastening a structural element 28 (subassembly), said screw drawing the structural element 28 onto the plastic nut 1, and thus onto the panel-like component 25, by means of its head and thus fastening said structural element on the component 25.

The panel-like component 25 may be, for example, any kind of panelling in a vehicle on which any kind of fittings, subassemblies or the like have to be fastened, for which purpose there is required a durable connection which can be subjected to loading and does not vibrate and for which the wall strength of the component alone does not normally provide sufficient strength. In this case, the plastic nut according to the invention has the advantage that the operation of fitting the abovementioned subassemblies and the like only requires manipulation on the side on which the subassembly is being fitted, that is to say there is no need for any manipulation behind the component, e.g. for securing a nut, since the configuration and method of fitting the plastic nut according to the invention virtually renders the latter a constituent part of the panel-like component. In this case, the automatically provided length of the plastic nut with its nut part benefits the strength of the connection of the component and subassembly in that a screw which is screwed into the plastic nut can be secured, over the length of the nut part, by a plurality of thread turns, this resulting in solid anchoring for the screw in the nut part.

The plastic nut 30a which is illustrated in FIG. 4 may advantageously be inserted into the through-hole in a component from the side which is directed away from the elastic supporting arrangement 39a, 40a, in which case the flange segments 32a and 33a lead. In this case, the snap-action hooks 34a, 35a come into contact, by way of their inlet slopes 43a, 44a, with the border of the through-hole, as a result of which the snap-action hooks 34a, 35a are easily bent together radially inwards. This is made possible by the slits 45*a*, 46*a* which project into the flange part 31*a* from the side of the snap-action hooks 34*a*, 35*a*. As far as the capacity of the snap-action hooks 34*a*, 35*a* to move elastically is concerned, you are referred to the above explanations relating to the region B in FIG. 5*a*.

The plastic nut 30*a* is fitted on a panel-like component similar to that according to FIG. 8 (designation 25), as is explained above, by the plastic nut 30*a* being inserted into the through-hole 26 (FIG. 8) until such time as the snap-action hooks 34*a*, 35*a* spring outwards and position themselves behind the component 25, which is supported on its other side against the abutments 37*a* and 38*a*. In the case of a component which is thicker than the distance A depicted in FIG. 4*b*, the nut part 36*a* is pushed away from the snap-action hooks 34*a*, 35*a*, in which case the supporting arrangement 39*a*, 40*a* is subjected to stressing and, as a result, presses the snap-action hooks 34*a*, 35*a* onto the component 25 from one side of the latter and presses the abutments 37*a*, 38*a* against the component 25 from the other side, as a result of which the plastic nut 30*a* is fitted on the component 25 in captive fashion and such that it does not vibrate. A further structural element may then be fastened on the plastic nut 30*a* and thus on said component, by means of a screw in the same way as is explained above with reference to FIG. 8.

As explained above, the plastic nut 1 according to FIGS. 5 to 7 is one in which only the nut part 4 is provided with snap-action hooks 5, 6, with the result that the plastic nut 1 is inserted into the through-hole 26 in a component 25 in a direction in which the elastic strips 13 and 14 lead, whereas the plastic nut 30 according to FIGS. 1 to 3 has snap-action hooks 34, 35 on the flange segments 32, 33, with the result that this plastic nut 30 can be fitted on a component in the direction in which these snap-action hooks 34, 35 lead.

FIG. 9 will now be used to explain a further exemplary embodiment, which is configured such that it can be pushed into the component from either side of the latter.

As far as the nut part is concerned, the plastic nut 47 according to FIG. 9 has essentially the same structure as the nut part 4 according to FIGS. 5 and 7. The nut part has the two snap-action hooks 5 and 6 (same designations as in FIG. 5). As is illustrated in FIG. 7*a*, the two snap-action hooks 5 and 6 can be pressed together, with the result that the nut part 4 can thus be pushed into the relevant component with the elastic strips 48, 49 leading. On the other hand, it is also possible for the plastic nut 47 to be pushed into the through-hole in a component in the opposite direction, that is to say with the snap-action hooks 34/35 leading, these hooks corresponding to the snap-action hooks according to FIG. 1, which have the same designations. By virtue of the arrangement of the snap-action hooks 5 and 6 and of the snap-action hooks 34 and 35, the plastic nut 47 may thus be used universally.

FIGS. 10*a* and *b* illustrate a plastic nut 50 in the case of which the flange part 51 and the nut part 52 are held together in a manner which is somewhat different from the exemplary embodiments according to FIGS. 4 and 5. The basic configuration of the plastic nut 50 corresponds to that of FIGS. 1*a* to *d*, so that, as far as the interaction of the flange part 51 and nut part 52 is concerned, you can refer to the explanations relating to these figures. According to FIGS. 10*a* and *b,* the elastic strips 53, 54 form a type of hook which projects from the bottom end of the flange part 51 and is bent radially inwards. The respective bent section 55, 56 projects in each case into a hole 57, 58 which is made in an arm 59, 60. The arms 59, 60 project away from the nut part 52 and, by way of their holes 57, 58, form receiving means for the bent sections 55, 56 of the elastic strips 53, 54. The direct single-piece connection which is illustrated in the exemplary embodiments according to FIGS. 4 and 5 for connecting the strips 13, 14 and 39*a*, 40*a* depicted therein to the relevant nut part 4 or 36 is thus replaced by the angled sections 55, 56 and the associated holes 57, 58 in the exemplary embodiment according to FIGS. 10*a* and *b*. The plastic nut 50 thus comprises two parts which can be injected moulded separately and are joined together in that when the nut part 52 is inserted into the flange part 51, which surrounds the nut part 52 in a sleeve-like manner, the angled sections 55, 56 are first of all bent away outwards until such time as the angled sections are located opposite the holes 57, 58, whereupon the angled sections 57, 58 can be snapped into the above-mentioned holes, this being readily possible on account of the elasticity of the strips 53, 54. The strips 53, 54, along with their angled sections 55, 56 then provide the necessary clearance for the displaceability of the nut part 52 with respect to the flange part 51 which is required for fitting the plastic nut 50, with the result that the plastic nut 50 can be fitted on a component in the same way as is described above, in particular in conjunction with FIGS. 4 and 9.

FIG. 10*a* illustrates a step 64 in the receiving bore in the nut part 52, comprising a through-hole 61 and a narrower region 62, this step being produced by thread-like slopes 63 being formed in the region of the transition from through-hole 61 to the narrower region 62, as a result of which it is made considerably easier for the first thread turn of a screw which is to be screwed in to penetrate into the narrower region 62. Of course, it is also possible for such a configuration of the through-hole to be provided in the case of the exemplary embodiments explained above.

Figure 10B:
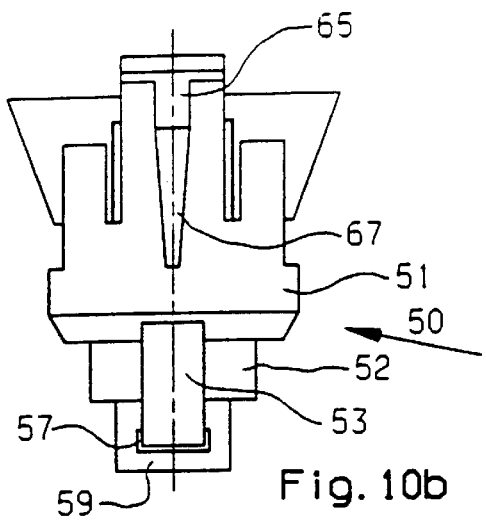

FIG. 10*b* illustrates a side view, which is turned through 90° with respect to FIG. 10*a,* of the plastic nut 50 and exhibits a further special feature of this plastic nut, namely the protrusions 65, 66 projecting radially outwards on the flange part 51. The protrusions 65, 66 are provided with inlet slopes 67, 68 which make it easier for the plastic nut 50 to be inserted into the through-hole in a component, part of which is illustrated in FIG. 11.

FIG. 11 show the plan view of part of a component 69 which exhibits the round through-hole 70 with the two recesses 71, 72 into which the protrusions 65, 66 which can be seen from FIGS. 10*a* and *b* fit. The interaction of the protrusions 65/66 with the recesses 71 and 72 produces a means which prevents the flange part 51 from turning with respect to the component 69. The diameter of the through-hole 70 is selected such that the sleeve-like flange part 51 can be inserted into the relevant through-hole 70 without obstruction.

Figure 12:
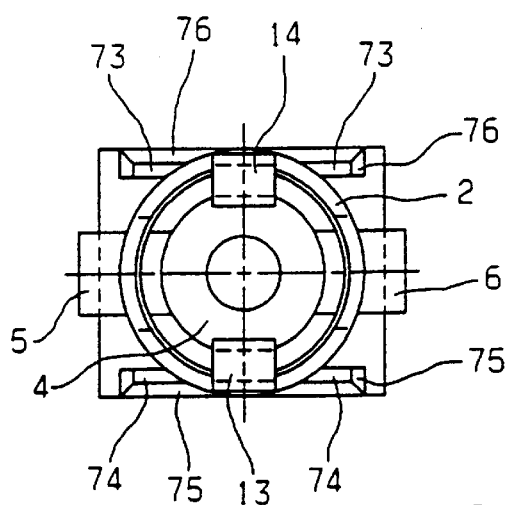
FIG. 12 shows the view of a plastic nut according to FIG. 5d with bars on the flange part, said bars causing turning to be prevented.

A means which prevents the flange part from turning with respect to a component can also be configured correspondingly in the case of the plastic nut 1 according to FIGS. 5*a* to *d*, to be precise by providing bars on that side of the flange 3 which is directed towards the relevant component, as is illustrated in FIG. 12. The plastic nut according to this figure corresponds fully to that according to FIGS. 5*a* to *d,* FIG. 12 only differing from FIG. 5*d* insofar as the bars 73, 74 are additionally provided on the flange 3 according to FIG. 12, which bars then have to be inserted into a correspondingly four-sided through-hole in a component in order thus, in this through-hole, to prevent the flange 3, and thus the plastic nut, from turning with respect to the relevant component.

In order to make it easier to insert the plastic nut according to FIG. 12 into a rectangular through-hole, the bars 73, 74 are each provided with inlet slopes 75, 76.

Figure 13:
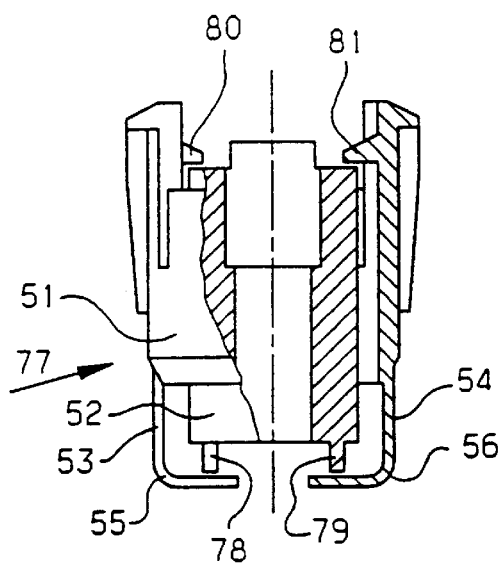
FIG. 13 shows a modification of the plastic nut according to FIGS. 10a and b in the case of which the flange part and nut part comprise separate parts.

FIG. 13 illustrates a variant of the plastic nut 50 according to FIGS. 10a, b, this variant only differing from the plastic nut 50 by the way in which the flange part 51 and nut part 52 are held together. The plastic nut 77 according to FIG. 13 has, in principle, the same elastic strips as the plastic nut 50. However, their angled sections 55 and 56 merely form stops with respect to the arms 78, 79, which are shortened in the case of the plastic nut 77, these stops thus limiting the insertion of the nut part 52 into the flange part 51. In order to prevent the nut part 52 from moving in the rearward direction, special latching noses, 80, 81 are provided on the flange part 51, these latching noses, on account of their inlet slopes, making it possible, or making it easier, to insert the nut part 52 into the flange part 51. Once the nut part 52 has been fully inserted into the flange part 51, the latching noses 80, 81 latch behind the nut part 52, with the result that, in terms of its freedom of movement, the latter is limited in both the forward and rearward directions. On account of the flexibility of the angled sections 55, 56, the necessary freedom of movement of the nut part 52 with respect to the flange part 51 is maintained.

Figure 14:
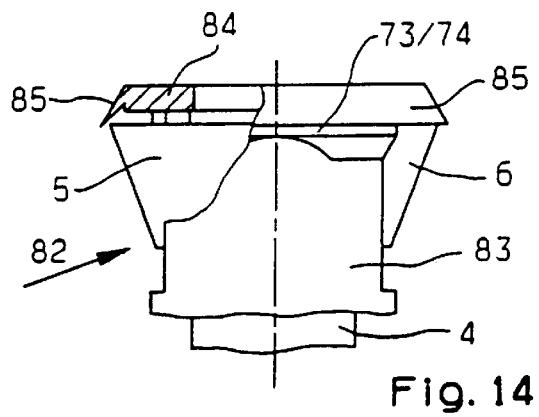
FIG. 14 shows a plastic nut which is provided with a seal.

The plastic nut according to the invention may advantageously be provided with a seal. This will be explained with reference to FIG. 14, which shows a plastic nut 82 which corresponds in principle to the plastic nut 1 according to FIG. 5. For this reason, it is also only those constituent parts of the plastic nut which are essential in this context which are illustrated specifically in FIG. 14. As can be seen, the plastic nut 82 has the two snap-action hooks 5 and 6 of the nut part 4 (as is also illustrated in FIG. 5a), but the flange part 83 is modified with respect to that according to FIG. 5. This is because the flange part 83 terminates in the flange 84 which is provided with the peripheral sealing lip 85 around its border. The sealing lip 85 positions itself against the component through which the plastic nut passes and, in this way, effects sealing between the flange 84 and component. The difference between the embodiment according to FIG. 5 and that according to FIG. 14 thus essentially only resides in the fact that the flange 3 according to FIG. 5 is replaced by the flange 84 with the sealing lip 85. This may be an attached sealing part with the sealing lip 85. However, it is also possible for the flange 84 itself to be designed as a sealing part with the sealing lip 85. It should also be pointed out that the turning-prevention means in the form of the bars 73/74, which can be seen from FIG. 12, is depicted in FIG. 14.

Figure 15:
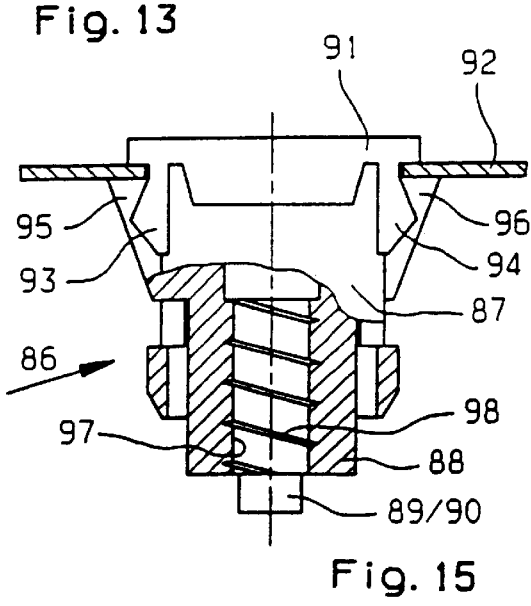
FIG. 15 shows a plastic nut which is similar to the plastic nut according to FIG. 5 and has a means for securing by additional latching noses.

FIG. 15 illustrates a further embodiment of a plastic nut 86, which corresponds in principle to the plastic nut in FIG. 5. The plastic nut 86 has the flange part 87 and the nut part 88, which are connected to one another via the elastic strips 89/90. The flange part 87 passes into the flange 91, which in this case, unlike the exemplary embodiment according to FIG. 5, is provided with the latching noses 93, 94 on its side which is directed towards the component 92. The plastic nut 86 is fitted on the component 92 in the same manner as in the case of the exemplary embodiment according to FIG. 1, in which case the snap-action hooks 95, 96 yield back correspondingly and finally latch in behind the component 92. Moreover, the latching noses 93, 94 latch in behind the component 92 in the process. The purpose of this additional means of securing the plastic nut 86 on the component 92 is that, by means of the snap-action hooks 95, 96 in conjunction with the action of the strips 89, 90, a certain thickness range, for example 1–5 mm, of the component 92 is spanned. This means that, in the event where the plastic nut 86 is fitted on a component 92 of only 0.5 mm in thickness, the plastic nut 86 is possibly fitted loosely, which is undesirable in many application cases. In order, nevertheless, for the plastic nut 86 to be configured such that it does not vibrate in the event of being fitted on such a thin metal panel, the latching noses 93 and 94 are provided, and these are configured such that they can position themselves resiliently behind the border of a particularly thin component 92 and thus retain the flange part 87 on the component 92 such that it does not vibrate.

The plastic nut 86 according to FIG. 15 also contains the thread 98 which is made in the narrower region 97 and is provided for receiving a screw provided with a corresponding thread. Of course, it is possible for a thread of this type to be provided in all the plastic nuts described above.

In the case of the exemplary embodiment which is illustrated in FIGS. 1 to 3, the nut part 36 is retained loosely in the flange part 31 such that it can move axially. In the direction away from the snap-action hooks 34/35, it is stopped by stops similar to those according to FIG. 5 (designations 20/22, 21/23), but could slide out in the direction of the flange 34/35. In order to prevent this, it is also possible in the exemplary embodiment according to FIGS. 1 to 3 to provide an additional inner latching nose, as is illustrated in FIG. 13 by designations 80 and 81.

The exemplary embodiment which is illustrated in FIGS. 16a–d is a plastic nut 101 in the case of which the snap-action hooks 105 and 106 latch in as a screw is screwed in (see screw 27 in FIG. 8 of Patent Application 196 39 396). The plastic nut 101 corresponds largely to that according to FIGS. 5a–d of Patent Application 196 39 396, in the case of which the snap-action hooks 5 and 6 of the plastic nut 1 of the latter patent application are illustrated in their relaxed position, spread radially outwards, and are positioned behind a component (not depicted). In contrast, the snap-action hooks 105 and 106 of the plastic nut 101 according to FIGS. 16a–d, in the relaxed state, assume a position in which they are inclined towards one another, as can be seen clearly, in particular, from FIG. 16a. As regards the other constituent parts of the plastic nut 101 and the functions thereof, you are referred to the explanations relating to said FIGS. 5a–d. In order to aid understanding, the designations from FIGS. 5a–d have been supplemented by the number "100".

In its relaxed position according to FIG. 16a, the plastic nut 101 can be inserted into a round through-hole, as is illustrated in FIG. 11 of Patent Application 196 39 396 (the latter additionally having the recesses 71 and 72, which can be dispensed with for use in conjunction with the plastic nut 101). Once the plastic nut 101 has been inserted into a through-hole (see FIG. 8 of Patent Application 196 39 396: through-hole 26 in the panel-like component 25), a screw (screw 27 in FIG. 8) can then be screwed into the through-hole 111 and the narrower region 112 of the nut part 104, in which case the two snap-action hooks 105 and 106 are pressed outwards and position themselves with their abutment surfaces 107 and 108 against the component and thus latch in.

This assembled arrangement of plastic nut, panel-like component and screw is illustrated in said FIG. 8, so that, as regards the mode of operation of the plastic 101 according to FIGS. 16a–d, you can refer to FIG. 8 and the associated explanations. In each case, the action of screwing a screw into the plastic nut 101 to the full extent results in the plastic nut 101, along with its snap-action hooks 105 and 106, being in a position which corresponds to the relevant parts from FIG. 8.

The configuration of the plastic nut 101 makes it possible for the plastic nut to be inserted into the through-hole in a component virtually without contact, this being advantageous, in particular, when the borders of the through-hole in the component consist of sensitive material. This is the case, for example, when the plastic nut 101, of corresponding size, serves for insertion into lightweight structural elements as are conventional, for example, for interior panelling.

The exemplary embodiment which is illustrated in FIGS. 17a–d, 18a–c and 19a–c is a plastic nut 201 which is retained on a panel-like component on account of the rotationally resilient connection of the snap-action hooks with respect to the flange part.

Figure 19A:
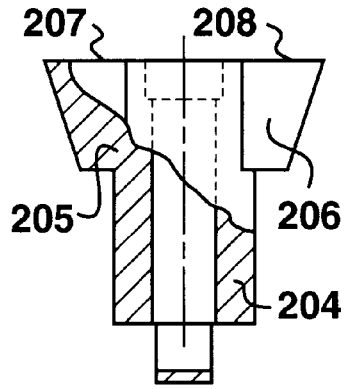
FIGS. 19a–c show three views of the nut part of the plastic nut according to FIG. 17 alone.
Figure 19B:
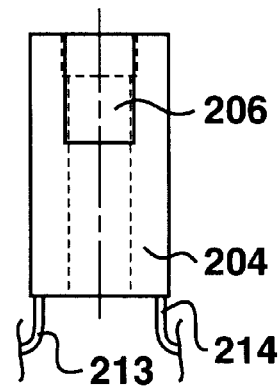
Figure 19C:
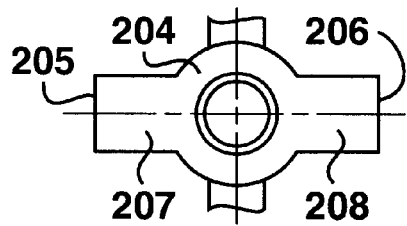

The configuration of the plastic nut 201 likewise coincides largely with that according to FIGS. 5a–d of Patent Application 196 39 396.5, so that you can refer to the associated parts of the description hereby incorporated in the present description. In order to aid understanding, the designations from FIGS. 5a–d, FIGS. 6a–c and 7a–7c are supplemented by the number "200". Unlike the plastic nut 1 according to said FIGS. 5a–d, the snap-action hooks 205 and 206 pass rigidly into the nut part 204 with its flange part 202, that is to say, in contrast to the snap-action hooks 5 and 6 from the abovementioned FIGS. 5a–d, the snap-action hooks 205 and 206 cannot be pressed together. This can be seen from that configuration of the nut part 204 which is illustrated in FIGS. 19a–c, this configuration largely following FIGS. 7a–c of Patent Application 196 39 396.5, so that reference may be made to that part of the description in the abovementioned patent application which deals with these figures. Unlike the configuration according to FIGS. 7a–7c, in which the slits 17 and 18 cause the snap-action hooks 5 and 6 to be separated from the nut part 4 in their region, there are no such slits in the configuration according to FIGS. 19a–c, as is shown in particular by FIG. 19c, with the result that the combination of the nut part 204 and the snap-action hooks 205 and 206 fitted thereon produces a compact component which is inherently rigid.

In the configuration of the plastic nut 201, use is made of the elasticity of the two strips 213 and 214 (supporting arrangement for connecting the nut part 204 to the flange part 202), namely to the effect that the elastic strips 213 and 214 produce a rotationally resilient connection between the nut part 204 and flange part 202 and thus in relation to the snap-action hooks 205 and 206.

Figure 17A:
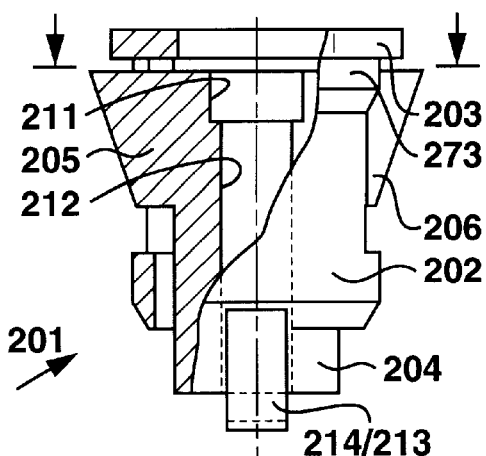
FIGS. 17a–d show, likewise in four views, an embodiment with snap-action hooks which are provided in a rotationally resilient manner with respect to the flange part and pass rigidly into the nut part.
Figure 17B:
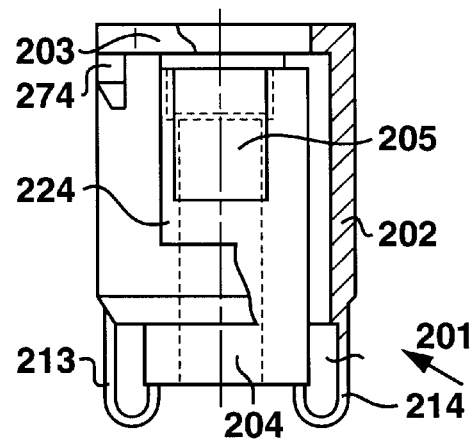
Figure 17C:
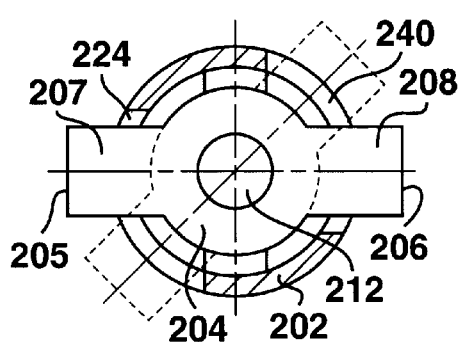
Figure 17D:
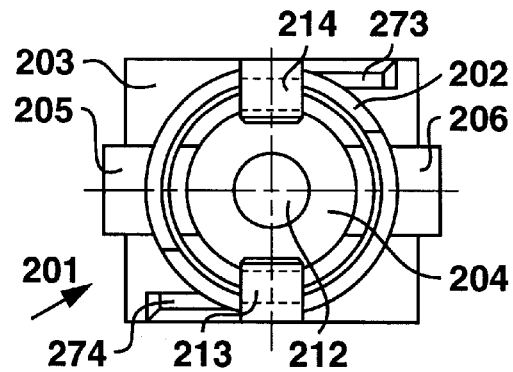
Figure 18A:
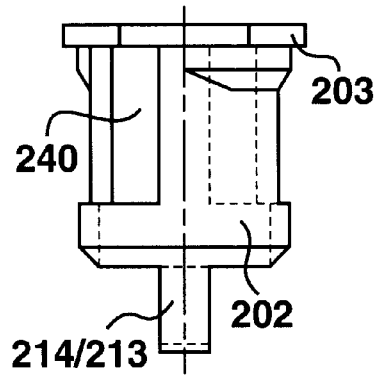
FIGS. 18a–c show three views of the flange part of the plastic nut according to FIG. 17 alone.
Figure 18B:
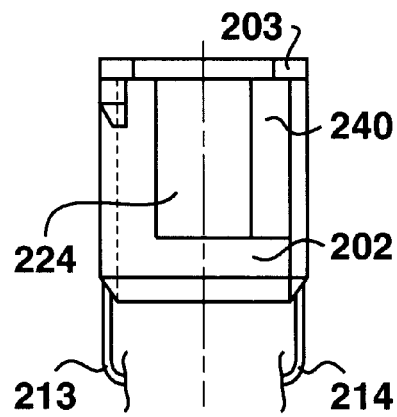
Figure 18C:
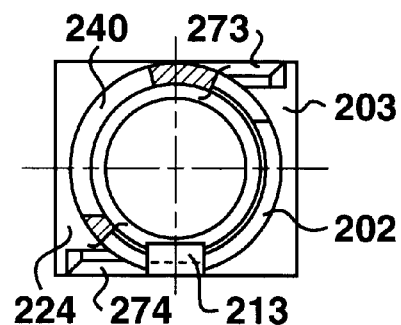

In order to be able to make use of the flange part 202 and the snap-action hooks 205 and 206 being retained in a rotationally resilient manner, there are provided on the flange part 202 of the plastic nut according to FIGS. 18a–c, in the region of the snap-action hooks 205 and 206 which pass through the flange part 202, circularly extending recesses 240 which pass into the windows 224 (the corresponding windows 24 can be seen, in particular, from FIGS. 5c and 6b of Patent Application No. 196 39 396.5). The circular widening of the windows 224 into the region of the recesses 240 makes it possible, while making use of the elasticity of the strips 213 and 214, for the nut part 204, along with its snap-action hooks 205 and 206 projecting rigidly from it, to be turned with respect to the flange part 202, to be precise from the position which is illustrated by solid lines in FIG. 17c into the position which is depicted by dashed lines. This constitutes a turn through approximately 45°.

It is also possible to see the recesses 240 in FIGS. 18a–c, which show the flange part 202 with the flange 203. The illustration in FIGS. 18–c follows that in FIGS. 6a–c from Patent Application No. 196 39 396, and you are referred to this and the associated description.

In order to be able to insert the plastic nut according to FIGS. 17a–d into the panel-like component 369 according to FIG. 20, the latter has the square through-hole 370 with the recesses 371, 372. A turning-prevention means is produced on account of the square configuration of the through-hole 370 and of the two bars 273 and 274 provided on the flange part 202.

In the case of the plastic nut 201 thus inserted into the component 369, the nut part 204 is then turned such that the two snap-action hooks 205 and 206 pass into the region of the recesses 371, 372, with the result that the plastic nut 201, together with snap-action hooks 205 and 206, can be pressed through the component 369 in its entirety until such time as the snap-action hooks 205 and 206 pass to the rear side of the component 369 (see illustration in FIG. 8 of Patent Application No. 196 39 396.5) and thus, on account of the rotational resilience of the strips 213, 214, are turned back into their normal position according to FIG. 17c. In this normal position, the snap-action hooks 205 and 206 are positioned behind the component 369, which is thus retained, on the one hand, by the flange 203 and, on the other hand, by the snap-action hooks 205, 206.

FIG. 20 shows a schematic illustration of a plastic nut 201 which is inserted into the component 369 and is located in the latched-in position, in which the snap-action hooks 205 and 206 are positioned behind the component 369.

It should also be pointed out that, instead of the through-hole 370 which is illustrated as a square in FIG. 20, it is also possible to use a round hole, although this then has to be provided with a recess into which a corresponding turning-prevention means on the plastic nut fits.

What is claimed is:

1. A plastic nut for inserting into a through-hole in a panel-like component, the plastic nut comprising:

a flange part having a flange and a spring zone and at least one snap-action hook, wherein said flange part is pressable into the through-hole of the component from a fitting side to latch the at least one snap-action hook at the other side of the component;

a nut part having a receiving bore for a screw, wherein said nut part is encased in the spring zone of said flange part, wherein said nut part is moveable axially within the spring zone; and an elastic supporting arrangement which presses said nut part within the spring zone toward the at least one snap-action hook of the flange part into abutment against the component, whereby the nut part is firmly pressed against the component regardless of the thickness of the component.

2. A plastic nut according to claim 1, wherein the flange part guides the nut part such that it substantially does not turn.

3. A plastic nut according to claim 1, wherein the flange of the flange part is divided up into segments which are each provided with a snap-action hook.

4. A plastic nut according to claim 3, wherein the nut part is also provided with at least one snap-action hook.

5. A plastic nut according to claim 1, wherein the flange part surrounds the nut part in a sleeve-like manner.

6. A plastic nut according to claim 1, wherein the flange part and the nut part are provided with stops for limiting axial movement.

7. A plastic nut according to claim 1, wherein the nut part and flange part are connected to one another integrally via plastic strips, which form the elastic supporting arrangement.

8. A plastic nut according to claim 1, wherein the nut part and flange part are held together by a latching means, which takes effect when the nut part is pushed into the flange part.

9. A plastic nut according to claim 8, wherein the latching means contains the elastic supporting arrangement.

10. A plastic nut according to claim 1, wherein the flange is provided, on its side which is directed towards the nut part, with a turning-prevention means which fits into the through-hole.

11. A plastic nut according to claim 1, wherein the flange is provided with a sealing zone.

12. A plastic nut according to claim 1, wherein the receiving bore in the nut part forms a through-passage region on the side which is directed towards the flange and has a narrower region adjoining said through-passage region.

13. A plastic nut according to claim 12, wherein the narrower region has a diameter which makes it possible for a self-tapping screw to be screwably attached therein.

14. A plastic nut according to claim 12, wherein the narrower region has a thread.

15. A plastic nut according to claim 13, wherein the receiving bore forms, at its transition to its narrower region, one or more steps via a thread-like slope.

16. A plastic nut according to claim 1, wherein on the side of the flange which is directed towards the component, the flange is provided with latching noses which can be latched in behind the side of the component which is directed away from the flange.

17. A plastic nut according to claim 1, wherein the flange part guides the nut part with sufficient play to allow mutual displacement in the radial direction.

18. A plastic nut according to claim 1, wherein the at least one snap-action hook is connected resiliently to the nut part such that, upon insertion, the at least one snap-action hook passes through the through-hole substantially freely and, for the purpose of latching in, can be pressed outwards by the action of a screw being screwed therein.

19. A plastic nut according to claim 1, wherein the at least one snap-action hook passes rigidly into the nut part, and the nut part is connected to the flange part via an elastic supporting arrangement, which presses the nut part in the direction of the flange part and also retains the nut part, together with the at least one snap-action hook, in a rotationally resilient manner with respect to the flange part.

20. A plastic nut for inserting into a through-hole in a panel-like component, the plastic nut comprising:

a flange part having a flange that is configured as a plate and a spring zone, wherein the spring zone of said flange part is pressable into the through-hole of the component;

a nut part provided with at least one snap-action hook and having a receiving bore for a screw, wherein said nut part is encased in the spring zone of said flange part, wherein said nut part is moveable axially within the spring zone; and an elastic supporting arrangement which presses said flange part, relative to said nut part, toward the at least one snap-action hook of said nut part into abutment against the component and the at least one snap-action hook latches at the other side of the component, whereby the nut part is firmly pressed against the component regardless of the thickness of the component.

21. A plastic nut according to claim 20, wherein the flange part guides the nut part such that it substantially does not turn.

22. A plastic nut for inserting into a through-hole in a panel-like component, the plastic nut comprising:

a flange part having a flange and a spring zone and at least one snap-action hook, wherein said flange part is pressable into the through-hole of the component from a fitting side to latch the at least one snap-action hook at the other side of the component;

a nut part having a receiving bore adapted for a screw, wherein said nut part is encased in the spring zone of said flange part and said nut part is moveable axially within the spring zone, wherein said receiving bore in the nut part has a through-passage region on the side which is directed towards the flange and a narrower region adjoining said through-passage region, wherein said receiving bore has, at the transition between said through-passage region and said narrower region, at least one step via a thread-like slope; and an elastic supporting arrangement which presses said nut part within the spring zone toward the at least one snap-action hook of the flange part into abutment against the component, whereby the nut part is firmly pressed against the component regardless of the thickness of the component.

23. A plastic nut according to claim 22, wherein said narrower region has a diameter adapted for a self-tapping screw to be screwably attached therein.

* * * * *